US012469115B2

(12) United States Patent
Okuno

(10) Patent No.: US 12,469,115 B2
(45) Date of Patent: Nov. 11, 2025

(54) INFORMATION PROCESSING DEVICE AND MACHINE TOOL

(71) Applicant: DMG MORI CO., LTD., Nara (JP)

(72) Inventor: Junichiro Okuno, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 2 days.

(21) Appl. No.: 18/594,937

(22) Filed: Mar. 4, 2024

(65) Prior Publication Data

US 2024/0202890 A1 Jun. 20, 2024

Related U.S. Application Data

(63) Continuation of application No. PCT/JP2022/031001, filed on Aug. 17, 2022.

(30) Foreign Application Priority Data

Sep. 6, 2021 (JP) .................................. 2021-144424

(51) Int. Cl.
*G06T 5/80* (2024.01)
*B23Q 11/00* (2006.01)
(Continued)

(52) U.S. Cl.
CPC ............ *G06T 5/80* (2024.01); *B23Q 11/0042* (2013.01); *B23Q 17/2409* (2013.01);
(Continued)

(58) Field of Classification Search
CPC ... G06T 5/80; G06T 7/001; G06T 7/11; G06T 7/33; G06T 2200/24; G06T 2207/30164;
(Continued)

(56) References Cited

U.S. PATENT DOCUMENTS

2010/0039548 A1 2/2010 Sakai
2016/0140419 A1* 5/2016 Sumitomo ......... G06V 10/7515
382/216
(Continued)

FOREIGN PATENT DOCUMENTS

JP 2010-045733 A 2/2010
JP 2014-099832 A 5/2014
(Continued)

*Primary Examiner* — Kelly L Jerabek
(74) *Attorney, Agent, or Firm* — IP Business Solutions, LLC

(57) ABSTRACT

An information processing device according to an aspect processes an image P0 to be used for a machine tool that takes the image of an imaging area with a camera and discharges fluid toward a target on the basis of the image P0. The information processing device includes: a reference information storage unit that stores, in advance, a line BL that is to correspond to an outline of a specific area SA of the machine tool on the image P0 when the image P0 is displayed; a correction unit that turns the image P0 in a rotating direction of an optical axis of the camera so that the outline of the specific area SA displayed on the image P0 matches the line BL; and a display control unit that causes a corrected image, resulting from correction by the correction unit, to be displayed on a display unit.

9 Claims, 15 Drawing Sheets

(51) Int. Cl.
*B23Q 11/10* (2006.01)
*B23Q 17/24* (2006.01)
*G06T 7/00* (2017.01)
*G06T 7/11* (2017.01)
*H04N 7/18* (2006.01)

(52) U.S. Cl.
CPC ............ *B23Q 17/249* (2013.01); *G06T 7/001* (2013.01); *G06T 7/11* (2017.01); *H04N 7/183* (2013.01); *B23Q 11/10* (2013.01); *G06T 2200/24* (2013.01); *G06T 2207/20021* (2013.01); *G06T 2207/20081* (2013.01); *G06T 2207/20084* (2013.01); *G06T 2207/20092* (2013.01); *G06T 2207/30164* (2013.01)

(58) Field of Classification Search
CPC . G06T 2207/20021; G06T 2207/20081; G06T 2207/20084; G06T 2207/20092; G06V 10/70; G06V 10/74; G06V 10/752; B23Q 11/00; B23Q 11/10; B23Q 11/0042; B23Q 17/00; B23Q 17/249; B23Q 17/2409

See application file for complete search history.

(56) References Cited

U.S. PATENT DOCUMENTS

| | | | |
|---|---|---|---|
| 2017/0043442 A1* | 2/2017 | Takikawa | B05B 15/60 |
| 2017/0345193 A1* | 11/2017 | Peterson | G06T 11/80 |
| 2019/0244021 A1* | 8/2019 | Franchi | G06V 10/752 |

FOREIGN PATENT DOCUMENTS

| | | |
|---|---|---|
| JP | 2014-165554 A | 9/2014 |
| JP | 6887033 B1 | 5/2021 |
| JP | 6921354 B1 | 7/2021 |

\* cited by examiner

INFORMATION PROCESSING DEVICE AND MACHINE TOOL

BACKGROUND OF INVENTION

1. Field

The present invention relates to an information processing device that processes images to be used for a machine tool.

2. Description of Related Art

In machining of a workpiece in a machine tool, chips are produced. Accumulation of a large volume of chips in a machining chamber makes machining difficult to continue. Conventionally, operators have therefore taken such measures as periodically stopping the operation of machine tools and removing chips by using air blows or the like. Such manual removal of chips, however, lowers the operational efficiency of the machine tools.

Recently, a system for automatically removing chips by installing a camera in a machining chamber and analyzing images taken with the camera is therefore proposed (refer to Patent Literature 1). According to this system, control of determining a position to which chips have scattered on the basis of an analysis result and discharging coolant to the scattering position as a target (hereinafter also referred to as "cleaning control"). In addition, a technology of displaying a chip scattering range over a taken image displayed on a screen of a monitor, which allows an operator to specify, on the screen, a range to which coolant is to be discharged, is also proposed. In software for cleaning control, association between coordinates of an imaging area to be imaged by a camera and coordinates used for coolant control commands is set in advance.

Related Art List

Patent Literature 1: JP 6887033 B1

Note that, when such a system is newly introduced, cases where the system is additionally installed in an existing machine tool can be assumed. In such cases, attachment error of a camera that is additionally installed or the like may cause differences between coordinates of an imaging area displayed on a screen and coordinates of an imaging area recognized by the software. It is therefore necessary to eliminate the differences by adjusting the angle of the camera, or in other manners, before using the machine tool. Depending on the structure of the camera that is additionally installed or the installation position thereof, however, adjustment of the angle of the camera may be limited.

SUMMARY

An aspect of the present invention is an information processing device that processes an image to be used for a machine tool, the machine tool taking the image of an imaging area with a camera and discharging fluid toward a target on the basis of the image. The information processing device includes: a reference information storage unit that stores, in advance, a line that is to correspond to an outline of a specific area of the machine tool on the image when the image is displayed; a correction unit that turns the image in a rotating direction of an optical axis of the camera so that the outline of the specific area displayed on the image matches the line; and a display control unit that causes a corrected image, resulting from correction by the correction unit, to be displayed on a display unit.

Another aspect of the present invention is an information processing device that processes an image to be used for a machine tool, the machine tool taking the image of an imaging area with a camera and discharging fluid toward a target on the basis of information of the image. The information processing device includes: a display control unit that controls display of a line at a specific position on a display unit, the line being to correspond to an outline of a specific area of the machine tool; and a correction unit that turns the image in a state in which the image and the line are displayed on the display unit with the line overlaid on the image, so that the outline of the specific area of the machine tool imaged in the image matches the line. The display control unit causes a corrected image, resulting from correction by the correction unit, to be displayed on the display unit.

Still another aspect of the present invention is a machine tool. The machine tool includes: a camera that images an imaging area set in a machining chamber; an information processing device that processes an image obtained by the imaging; and a discharging portion that discharges fluid toward a target on the basis of the processed image. The information processing device includes: a reference information storage unit that stores, in advance, a line that is to correspond to an outline of a specific area set in the machining chamber on the image when the image is displayed; a correction unit that turns the image in a rotating direction of an optical axis of the camera so that the outline of the specific area displayed on the image matches the line; and a display control unit that causes a corrected image, resulting from correction by the correction unit, to be displayed on a display unit.

According to the present invention, even when adjustment of an angle of a camera in a machine tool is limited, an imaging area displayed on a screen and an imaging area recognized by software can be made to match each other.

DETAILED DESCRIPTION

An embodiment of the present disclosure will now be described with reference to the drawings.

Figure 1:
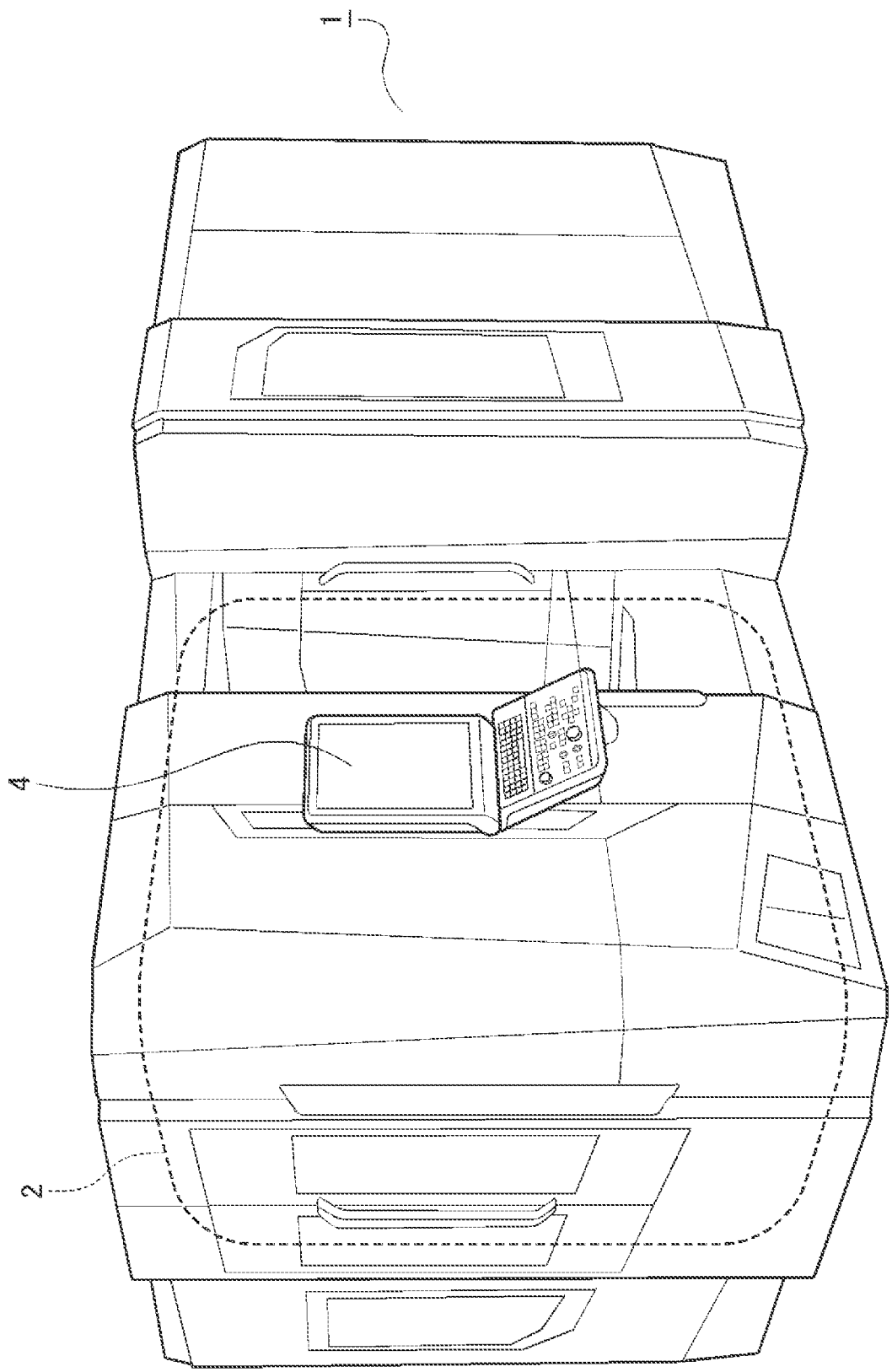
FIG. 1 is a perspective view of an external appearance of a machine tool according to an embodiment.

FIG. 1 is a perspective view of an external appearance of a machine tool according to an embodiment.

A machine tool 1 is a multi-tasking machine for machining workpieces into desired shapes by appropriately changing tools. The machine tool 1 has a machining chamber 2 inside an equipment housing. Machining equipment for machining workpieces is installed in the machining chamber 2. A console 4 for operating the machining equipment is provided on a front face of the equipment housing.

Figure 2:
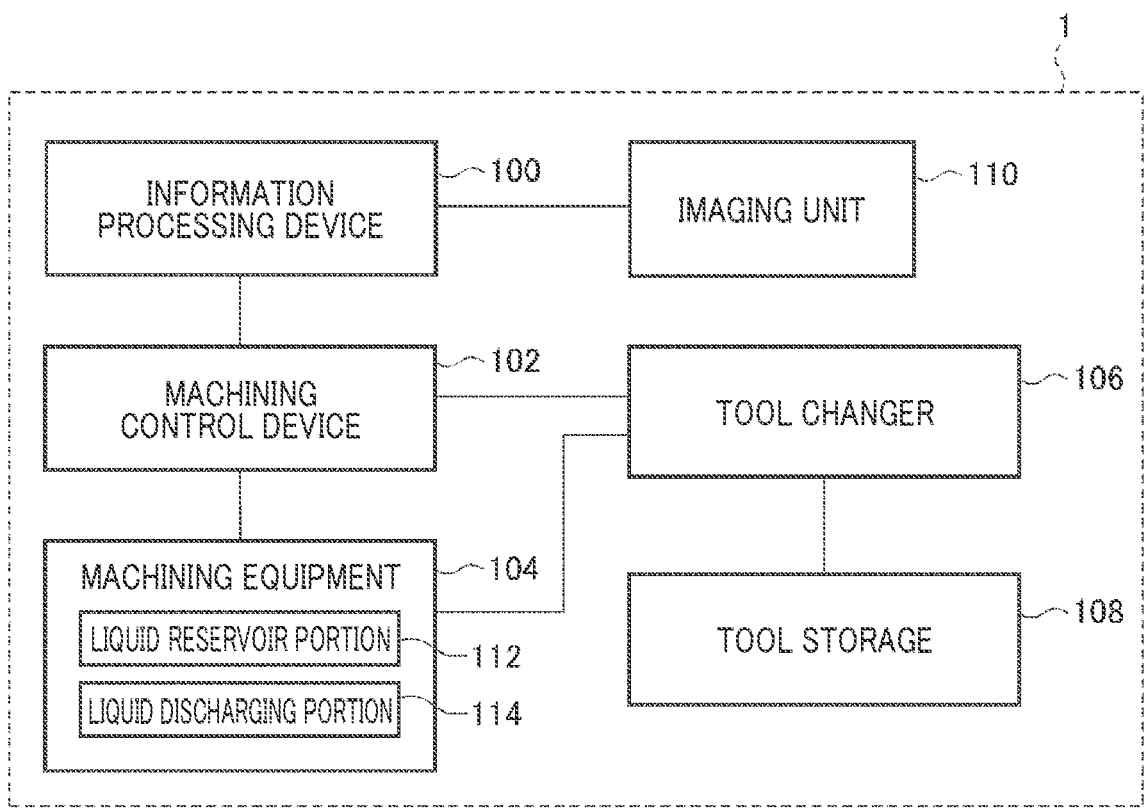
FIG. 2 is a diagram of a hardware configuration of the machine tool.

FIG. 2 is a diagram of a hardware configuration of the machine tool 1.

The machine tool 1 includes an information processing device 100, a machining control device 102, the machining equipment 104, a tool changer 106, a tool storage 108, and an imaging unit 110. The machining control device 102 functions as a numerical control unit, and outputs control signals to the machining equipment 104 in accordance with machining programs (NC programs). The machining equipment 104 moves a tool spindle (not illustrated; hereinafter simply referred to as a "spindle") in accordance with instructions from the machining control device 102 to machine a workpiece.

The machining equipment 104 includes a mechanism for driving the spindle, and in addition, a liquid reservoir portion 112 for storing a coolant, and a liquid discharging portion 114 for discharging the coolant. The coolant is used as cutting fluid for removing heat from and lubricating a tool and a workpiece during machining, and also as cleaning fluid for removing chips scattered in the machining chamber 2. The liquid discharging portion 114 includes a pump for pumping up the coolant from the liquid discharging portion 114, a nozzle for discharging the coolant, and an actuator for driving the nozzle.

The information processing device 100 includes the console 4, and outputs control commands to the machining control device 102 on the basis of operations input by an operator. The information processing device 100 also controls screens displayed on a monitor of the console 4 in response to operations input by the operator. The tool storage 108 stores tools. The tool changer 106 corresponds to a so-called automatic tool changer (ATC), which takes a tool out from the tool storage 108 and replaces a tool on the spindle with the taken-out tool in accordance with a replacement instruction from the machining control device 102.

The imaging unit 110 is a camera including an imaging sensor such as a CCD or a CMOS, for example, and images an imaging area set in the machining chamber 2. For the "imaging area", an area in which chips produced by machining of a workpiece are likely to be present is set in advance. The angle of view of the camera is set so that the distribution and accumulation of chips can be captured in a wide range in the machining chamber 2. The imaging unit 110 outputs taken images to the information processing device 100.

Figure 3A:
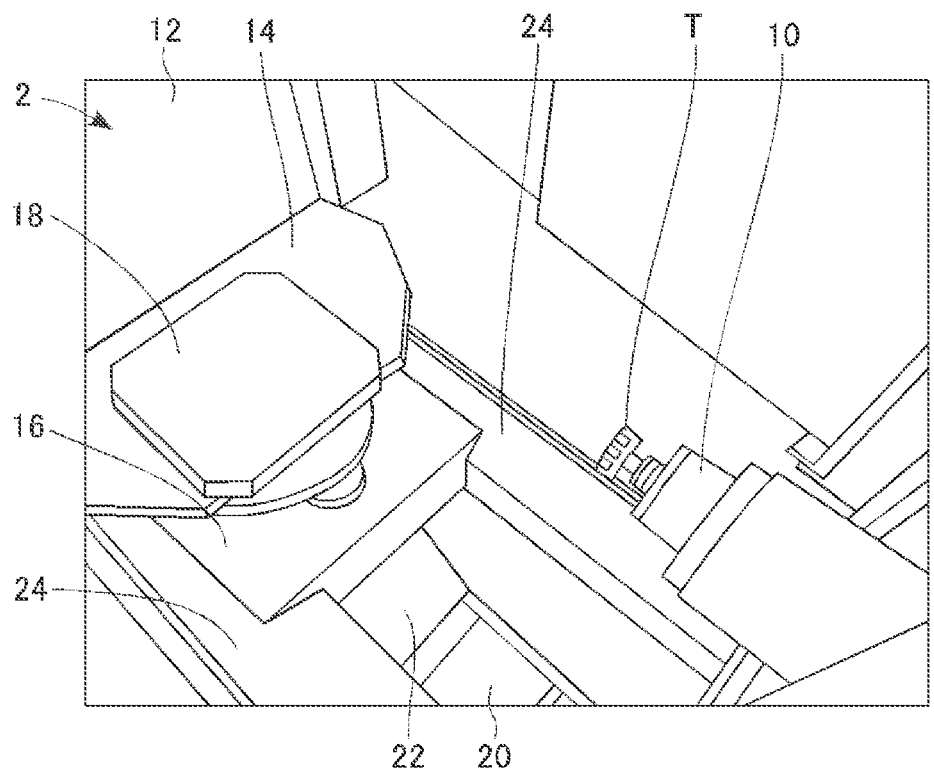
FIGS. 3A and 3B are perspective views of structures inside a machining chamber.
Figure 3B:
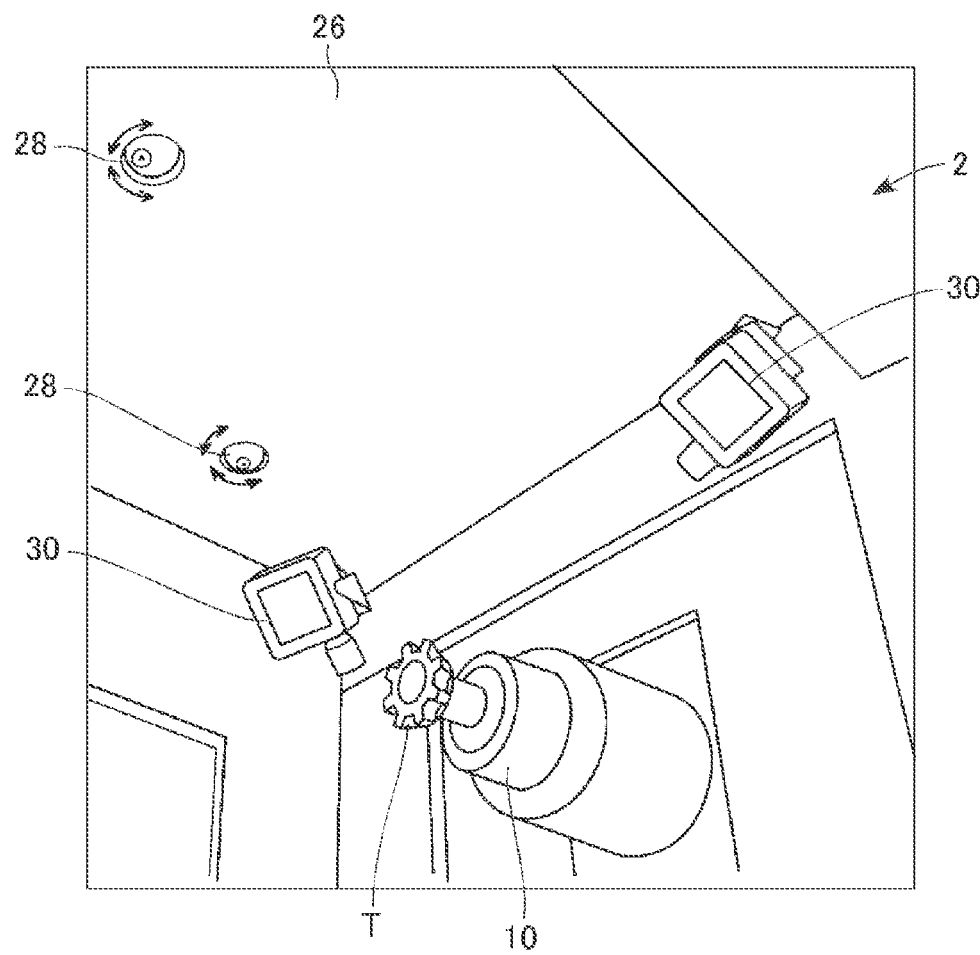

FIGS. 3A and 3B are perspective views of structures inside the machining chamber 2. FIG. 3A illustrates a view from obliquely above, and FIG. 3B illustrates a view from obliquely below.

As illustrated in FIG. 3A, the machining chamber 2 is surrounded by four side faces, and a spindle 10 is installed on one of the side faces in a manner in which the spindle 10 is movable vertically and horizontally. The spindle 10 has a rotation axis along a horizontal direction, and a tool T is coaxially attached to a distal end of the spindle 10. A side face opposite the spindle 10 in the axial direction has a revolving door 12. A support plate 14 extends horizontally from the revolving door 12. The revolving door 12 is a door that is turnable about a vertical axis.

A table 16 is provided below the support plate 14. A pallet 18 is removably attached to the table 16, and a workpiece is placed on and fixed to the pallet 18. A plurality of pallets 18 onto each of which a workpiece is fixed are prepared, so that a workpiece can be replaced by replacement of a pallet 18, which improves time efficiency.

The table 16 is movable along the axial direction of the spindle 10, and rotatable along a horizontal plane. The table 16 is driven to rotate so as to rotate the workpiece on the pallet 18. When the table 16 is linearly driven, the workpiece moves closer to or away from the tool T. Thus, control of the rotation and the movement of the table 16 and the movement of the spindle 10 enable machining of a workpiece into a desired shape.

At a position where the table 16 is farthest from the spindle 10, the support plate 14 is fitted to the pallet 18. When the revolving door 12 is turned in this state, the support plate 14 separates the pallet 18 from the table 16 and turns with the pallet 18. In this manner, a pallet 18 with a workpiece on which machining is completed can be taken out from the machining chamber 2 and a pallet 18 to which a workpiece to be machined next is fixed can be brought into the machining chamber 2.

A chip conveyor 20 for carrying chips out of the machining chamber 2 is provided below the table 16 and the spindle 10. The table 16 moves above the chip conveyor 20. A shooter 22 is provided below the table 16. The shooter 22 guides chips, which are flushed out from above by cleaning, onto the chip conveyor 20.

In the machining chamber 2, bottom faces on respective sides of the table 16 are slope faces 24, which are inclined down toward the shooter 22 so that chips scattered during machining easily flow to the shooter 22.

As illustrated in FIG. 3B, upper part of the machining chamber 2 is covered with a cover 26 (ceiling). A plurality of nozzles 28 for supplying the coolant are provided on the cover 26. In the present embodiment, the nozzles 28 are replaceable together with the cover 26. The nozzles 28 constitute the liquid discharging portion 114, and are connected with the liquid reservoir portion 112 via pipes, valves, pumps, and the like, which are not illustrated (see FIG. 2). The nozzles 28 are three-dimensionally rotatable. The coolant discharging direction can be controlled by rotation of the nozzles 28. The coolant can be discharged toward a target in the machining chamber 2 by specifying the directions of the nozzles 28 and driving the pumps. Chips produced during machining of workpieces are flushed out with the coolant and carried out of the machining chamber 2 by the chip conveyor 20. While two nozzles 28 are provided in the present embodiment, the number of nozzles 28 can be set as necessary.

A plurality of cameras 30 for imaging the inside of the machining chamber 2 from above are also provided in the upper part of the machining chamber 2. Specifically, the cameras 30 are fixed to the machine tool 1. In the present embodiment, two cameras 30 are attached to side walls at positions a little lower than the cover 26 in the machining chamber 2. In the present embodiment, the cameras 30 have structures that cannot be integrated with the cover 26 owing to wiring and other circumstances. The cameras 30 constitute the imaging unit 110, and are configured to image the state of a workpiece being machined with a tool T and to image chips produced during machining (see FIG. 2). Because two cameras 30 are provided, an area that cannot be imaged by one camera 30 can be imaged by the other camera 30. The imaging unit 110 outputs a taken image to the information processing device 100.

Figure 4:
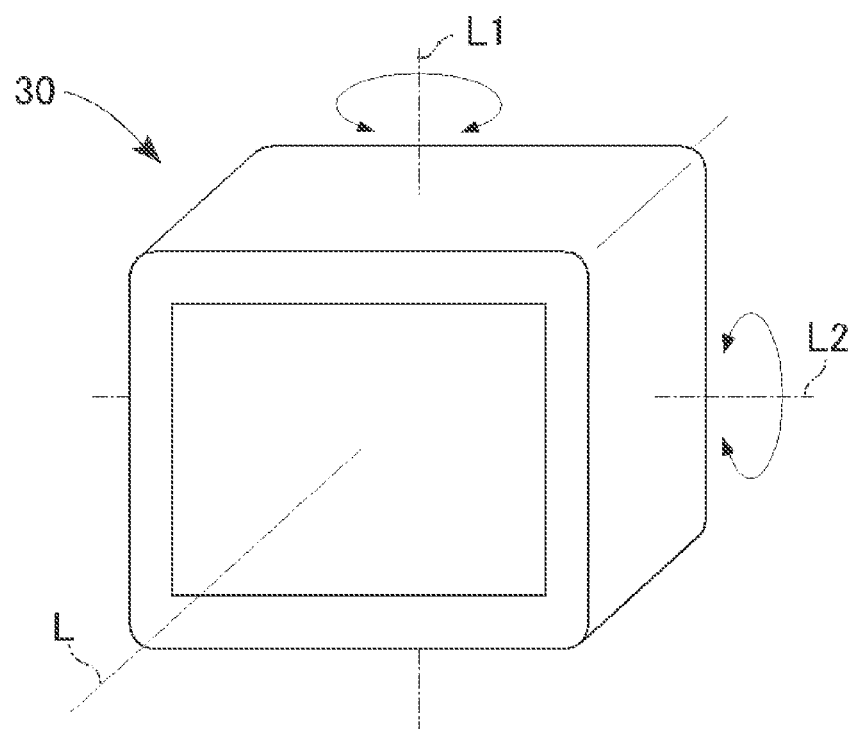
FIG. 4 is a diagram schematically illustrating a structure of a camera.

FIG. 4 is a diagram schematically illustrating a structure of a camera 30.

Each camera 30 in the present embodiment has a structure in which turning about its optical axis L is restricted. Specifically, each camera 30 is turnable about a yaw axis L1 perpendicular to the optical axis L and about a pitch axis L2 perpendicular to the optical axis L and to the yaw axis L1, but is not turnable about the optical axis L. Thus, in a case where the coordinates of an imaging area displayed on the screen and the coordinates of an imaging area recognized by software do not match each other owing to attachment error of a camera 30 or the like, it is difficult to manually adjust the coordinates. Thus, the information processing device 100 performs a correction process for eliminating the difference between the coordinates when the operator adjusts the angle of the camera.

Figure 5:
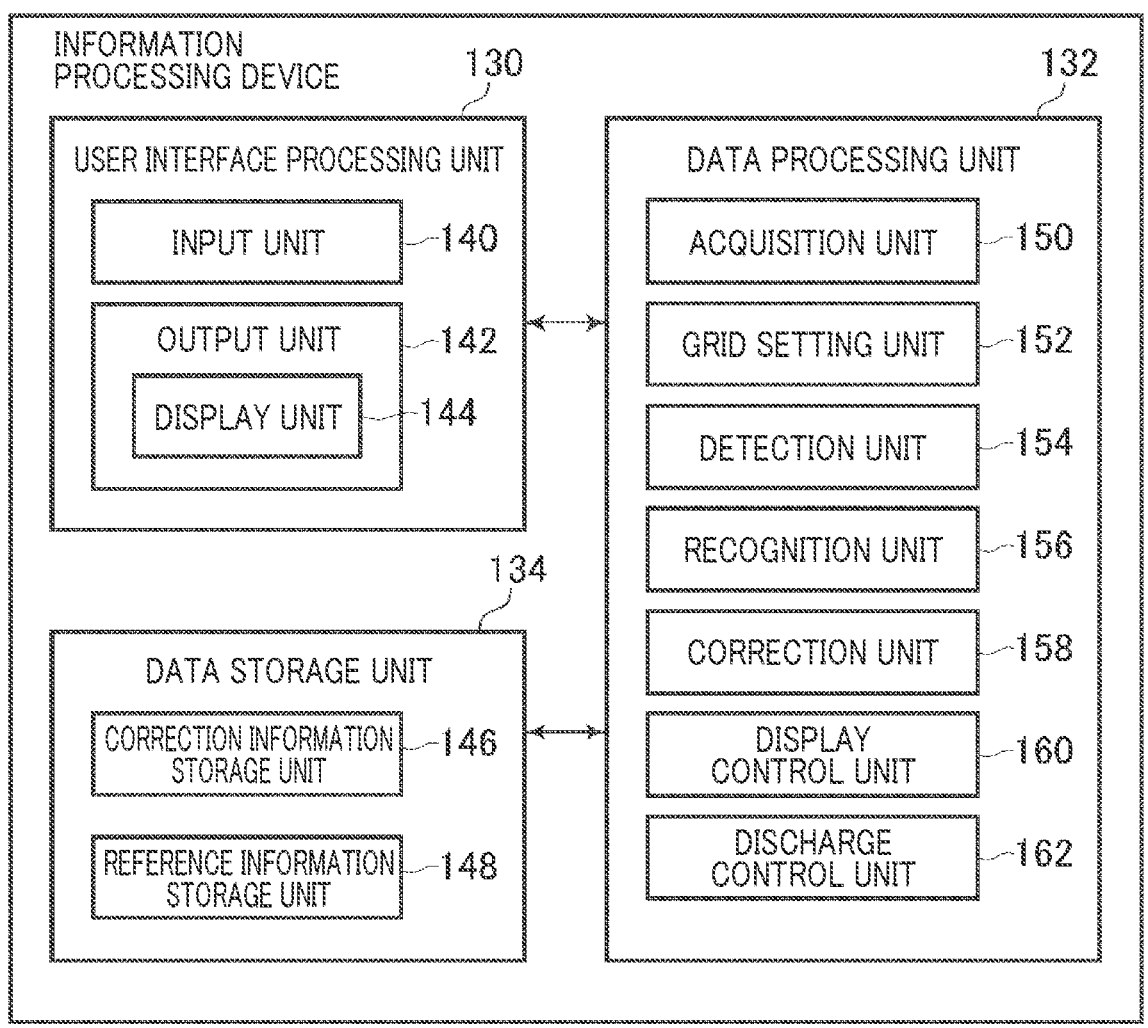
FIG. 5 is a functional block diagram of an information processing device.

FIG. 5 is a functional block diagram of the information processing device 100.

The components of the information processing device 100 are implemented by hardware including computing units such as central processing units (CPUs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. The blocks explained below do not represent configurations in units of hardware but represent blocks in units of functions.

The information processing device 100 includes a user interface processing unit 130, a data processing unit 132, and a data storage unit 134. The user interface processing unit 130 performs processes related to user interfaces such as receiving operations input by an operator and displaying images. The data processing unit 132 performs various processes on the basis of data obtained by the user interface processing unit 130 and data stored in the data storage unit 134. The data processing unit 132 also functions as an interface of the user interface processing unit 130 and the data storage unit 134. The data storage unit 134 stores various programs and set data therein.

The user interface processing unit 130 includes an input unit 120 and an output unit 142. The input unit 120 receives inputs performed by the operator via the touch panel of the monitor on the console 4 or the like. The output unit 142 includes a display unit 144 that displays images and the like on the screens of the monitor. The output unit 142 provides a variety of information to the operator via the display. The display unit 144 displays images taken by the imaging unit 110.

The data processing unit 132 includes an acquisition unit 150, a grid setting unit 152, a detection unit 154, a recognition unit 156, a correction unit 158, a display control unit 160, and a discharge control unit 162.

The acquisition unit 150 acquires images taken by the imaging unit 110. The grid setting unit 152 divides (sections) a taken image into a plurality of grid sections in order to determine (analyze) the presence of a predetermined substance (such as chips) in an imaging area. Each grid section has a specific shape (a square in the present embodiment, but any geometric shape), details of which will be described later. Hereinafter, an area that is divided into a plurality of grid sections in a taken image will also be referred to as a "grid area". In addition, an image constituted by multiple grid sections will also be referred to as a "grid image".

The detection unit 154 detects operations input by the operator via the input unit 120. The operator can view the chip accumulation state in the machining chamber 2 by referring to a taken image displayed on the display unit 144, details of which will be described later. The operator can then indicate a range for cleaning (a range for discharge) with the coolant by specifying an area in the taken image via the touch panel. The detection unit 154 detects the indication input by the as an indicated position on the taken image. The detection unit 154 may detect an indicated position based on a grid area generated by the grid setting unit 152.

The recognition unit 156 automatically recognizes chips on the basis of a grid area set in the taken image, determines whether or not chips are present in the grid area, and determines the volume of chips if any. These determinations will also be referred to as "chip determinations". If the recognition unit 156 has determined that chips are present in the grid area, the recognition unit 156 recognizes a position on the taken image corresponding to the grid area as a chip accumulation position. Upon recognizing the chip accumulation position, the recognition unit 156 outputs an automatic detection signal to the discharge control unit 162. The automatic detection signal at least includes information on a predetermined position at which accumulation of chips is recognized on the taken image.

Before cleaning control is performed, the correction unit 158 performs a correction process for making the coordinates of the imaging area of the camera 30 and the coordinates to be used for a coolant control command match each other on the basis of an operation performed by the operator. Because this correction process is performed on the assumption that there is an attachment error of the camera 30, this correction process is performed when the camera 30 is installed in the machining chamber 2. Details thereof will be described later.

The display control unit 160 causes an image taken by a camera 30 to be displayed on the display unit 144. When correction is to be performed by the correction unit 158, the display control unit 160 causes an operation screen for the correction to be displayed, and also causes the taken image resulting from the correction to be displayed. After the correction, the grid setting unit 152 divides the taken image into grid sections. The display control unit 160 causes the corrected taken image and the grid sections superimposed on the taken image to be displayed on the display unit 144. The recognition unit 156 analyzes the presence of a target in each grid section. Examples of display screens relating to the correction will be described later in detail.

When cleaning control is to be performed, the discharge control unit 162 outputs a command to discharge the coolant toward a target position to the machining control device 102. This discharge command includes information specifying a position to which the coolant is to be discharged (such as information specifying a discharge path). Upon receiving this discharge command, the machining control device 102 drives the liquid discharging portion 114 and controls discharge of the coolant.

The cleaning control is to flush out chips in the machining chamber 2 (that is, to clean the inside of the machining chamber 2) with the coolant, and an automated cleaning mode and a manual cleaning mode are selectable in the present embodiment. In the automated cleaning mode, the discharge control unit 162 automatically sets a position to which the coolant is to be discharged on the basis of the automatic detection signal output from the recognition unit 156, and outputs a discharge command. In contrast, in the manual cleaning mode, the discharge control unit 162 sets a position to which the coolant is to be discharged on the basis of specification of an area by the operator, which is detected by the detection unit 154, and outputs a discharge command.

The data storage unit 134 stores various programs including a correction program for performing the aforementioned correction process and a cleaning control program for performing the cleaning control, and various data necessary for the processes. The data storage unit 134 includes a correction information storage unit 146 and a reference information storage unit 148. The correction information storage unit 146 stores taken images obtained by the acquisition unit 150, grid areas (grid images) generated by the grid setting unit 152, information on a given position at which the presence of chips is recognized by the recognition unit 156 and information on the volume of chips, position information detected by the detection unit 154, and the like in the correction process. The correction information storage unit 146 also stores correction information (calibration data) obtained in the correction process, which will be described later. The reference information storage unit 148 stores images for guiding the operator's input of operations in the correction process. The data storage unit 134 also functions as a work area in computation processes.

An outline of chip recognition by the recognition unit 156 will now be explained.

Figure 6:
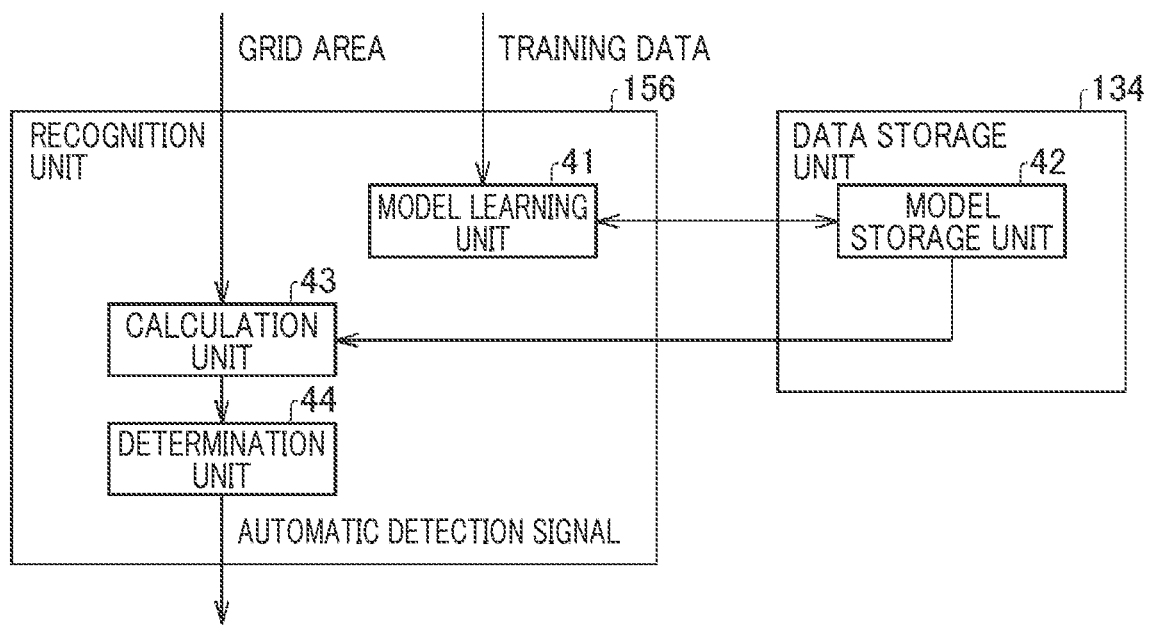
FIG. 6 is a block diagram illustrating a configuration of a recognition unit.

FIG. 6 is a block diagram illustrating a configuration of the recognition unit 156.

The recognition unit 156 includes a model learning unit 41, a calculation unit 43, and a determination unit 44.

The model learning unit 41 generates a learning model. The learning model is a model capable of calculating, in response to an input of one of the grid areas generated by the grid setting unit 152, which of predetermined items is relevant to the chips in the grid area and the probability of the relevance and outputting the calculation result. The learning model can be generated by inputting a pair of input data and output data as training data into a convolutional neural network (CNN) in advance to cause the CNN to learn the data pair, for example. In the present embodiment, a grid area can be used as input data, and information on the presence/absence and the volume of chips in the grid area can be used as output data.

The data storage unit 134 includes a model storage unit 42. The model storage unit 42 stores a learning model for automatically determining whether chips are present. The learning model is read into the calculation unit 43 as necessary.

The calculation unit 43 calculates the probability that chips in units of a grid area correspond to a predetermined item on the basis of a taken image. Specifically, the calculation unit 43 uses the learning model learned by the model learning unit 41 to calculate the probability that a grid area corresponds to each of three items, which are a "large volume of chips (class 2)", a "small volume of chips (class 1)" and "no chips (class 0)". The classes indicate the quantities of presence of materials (chips) recognized in the imaging area.

The determination unit 44 determines which of classes 0 to 2 chips in the input grid area correspond to on the basis of the probabilities calculated by the calculation unit 43. When it is determined that chips are present in a grid area (that is, chips in a grid area corresponds to class 2 or class 1), the determination unit 44 outputs an automatic detection signal including information on a position in a taken image corresponding to the position of the grid area in a grid image to the display control unit 160 and the discharge control unit 162.

As described above, during machining or after completion of machining of a workpiece, the recognition unit 156 can perform automated cleaning of automatically recognizing chips on the basis of an image taken by the imaging unit 110 and discharging the coolant. The automated cleaning may be periodically performed or may be performed in response to some instruction such as an instruction from the operator.

Next, a correction method in the present embodiment will be explained in detail.

As already described, when the cleaning control system is introduced, the coordinates of an imaging area displayed on screen and the coordinates of an imaging area recognized by software may not match each other. Thus, in the present embodiment, before using the machine tool 1, the operator performs operations to eliminate the difference between the coordinates such as adjusting the angle of a camera 30. For convenience of explanation, a state in which the coordinates match each other will also be referred to as a "screen matching state".

As described with reference to FIG. 4, because turning of the cameras 30 about their optical axes L is restricted in the present embodiment, adjustment of the cameras 30 is limited. Thus, setting error of the target of coolant discharge control may be caused. In the present embodiment, the correction unit 158 therefore corrects setting error of the target by turning an image taken by a camera 30. Details thereof will be explained below.

FIGS. 7 to 10B are diagrams illustrating a method for correcting screen display.

In the present embodiment, because a plurality of cameras 30 are provided, the correction is performed on each of the cameras 30. For convenience, an example of correction of one of the cameras 30 will be described. The other cameras 30 are similarly corrected, and the explanation thereof is therefore omitted.

Figure 7:
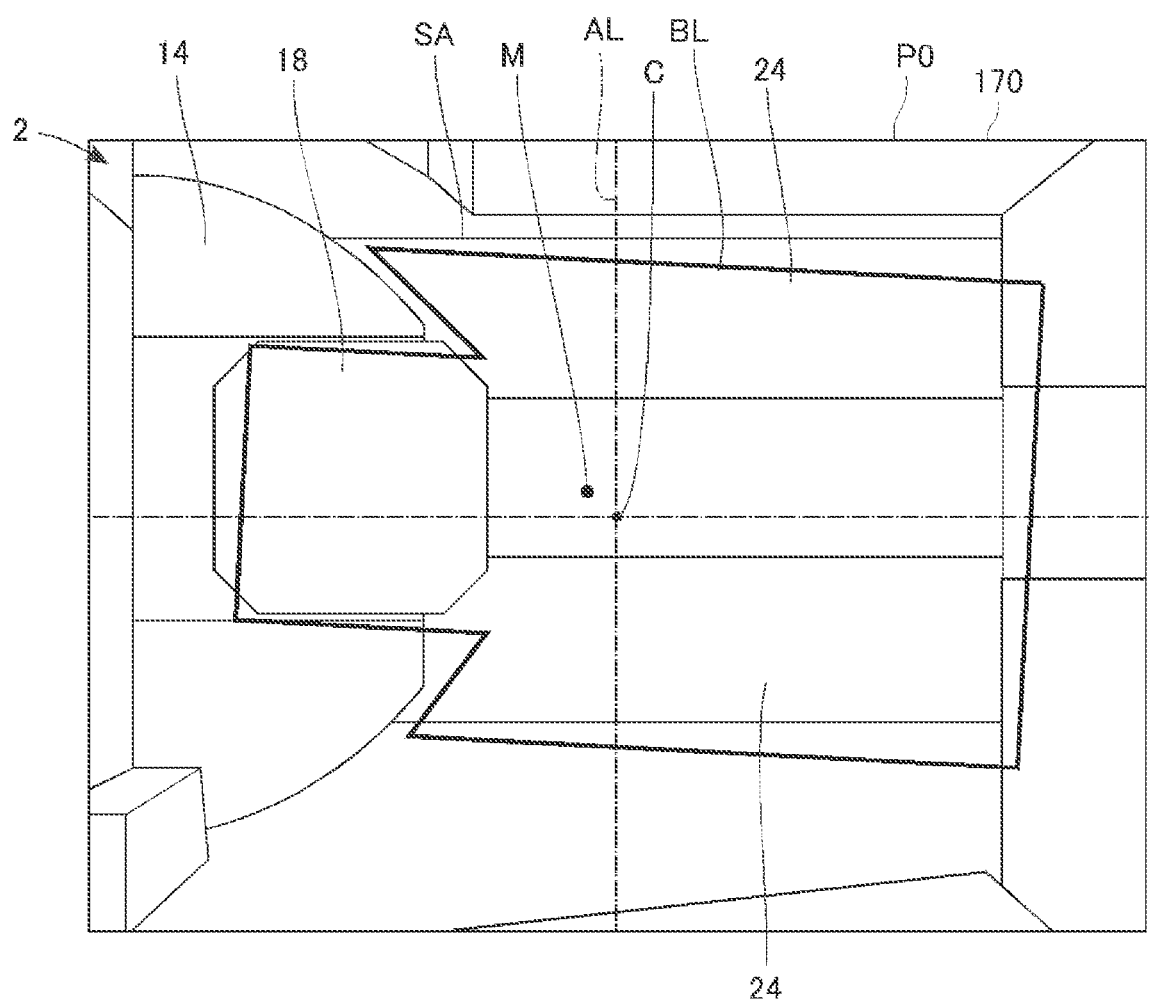
FIG. 7 is a diagram illustrating a method for correcting screen display.

A camera 30 is installed in the machining chamber 2 so that a predetermined imaging area is within the angle of view. The imaging area includes areas to and in which chips are expected to scatter and accumulate. Herein, assume that a taken image P0 illustrated in FIG. 7 is displayed on the screen (reference screen 170) of the display unit 144 when the camera 30 is installed in the machining chamber 2. When a maintenance mode (to be described later) for correcting the screen display is entered by an operation input by the operator, the display control unit 160 causes a baseline BL (thick line) and auxiliary lines AL (one-dot chain lines) to be displayed over the taken image P0.

The baseline BL is a line set to correspond to the outline of a specific area SA in the machining chamber 2 when the screen is in the matching state, and stored in advance in the reference information storage unit 148. In the present embodiment, an area surrounded by boundaries of the slope faces 24 and the edge of the pallet 18 is the specific area SA. The auxiliary lines AL are cross auxiliary lines passing the center C of the taken image P0 in the present embodiment. In the machining chamber 2, a marker M that matches the center C when the screen is in the matching state is put. The marker M is put at a center setting position that is set in advance in the imaging area.

In the state illustrated in FIG. 7, the center C of the taken image P0 does not match the marker M. In addition, the outline of the specific area SA does not match the baseline BL. Thus, this screen is not in the matching state. Thus, the operator first manually adjusts the angle of the camera 30 within a possible range so that the screen becomes closer to the matching state.

Figure 8A:
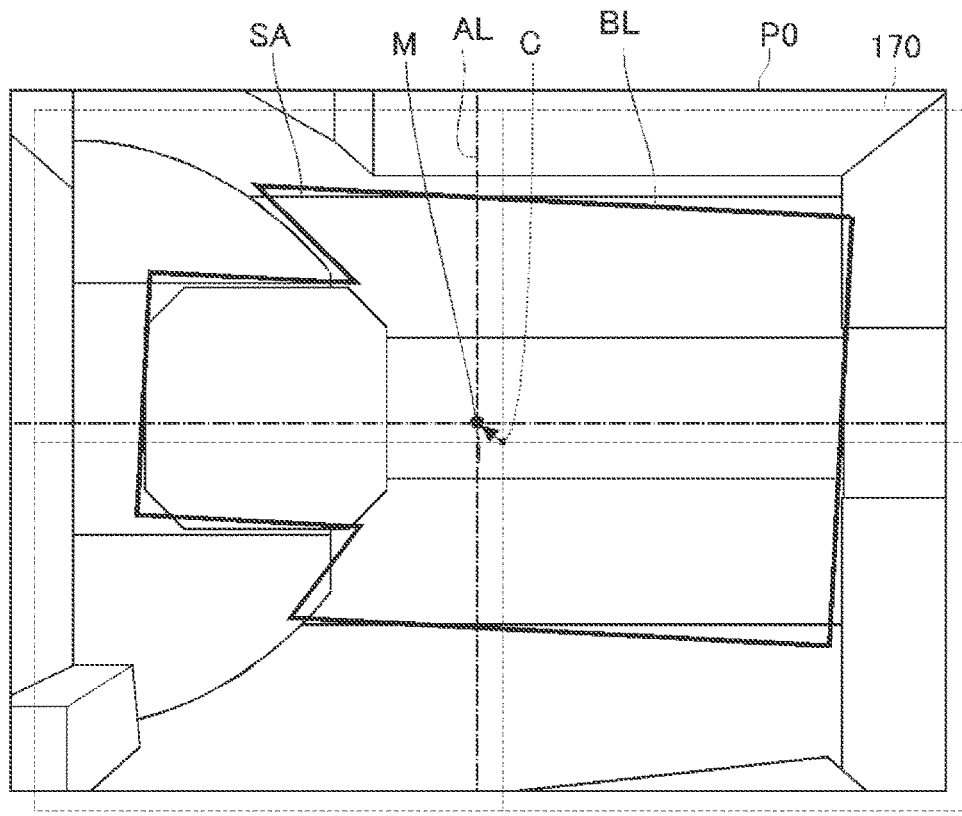
FIGS. 8A and 8B are diagrams illustrating the method for correcting screen display.

Specifically, the operator turns the camera 30 about the yaw axis L1 and the pitch axis L2 so that the center C of the taken image P0 matches the marker M as illustrated in FIG. 8A. The adjustment so far can be easily performed manually. In the illustrated example, however, the outline of the specific area SA still does not match the baseline BL at this point. This difference between the outline and the baseline BL can be eliminated if the camera 30 can be turned about the optical axis L, but the turning of the camera 30 about the optical axis L is restricted in the present embodiment.

Figure 8B:
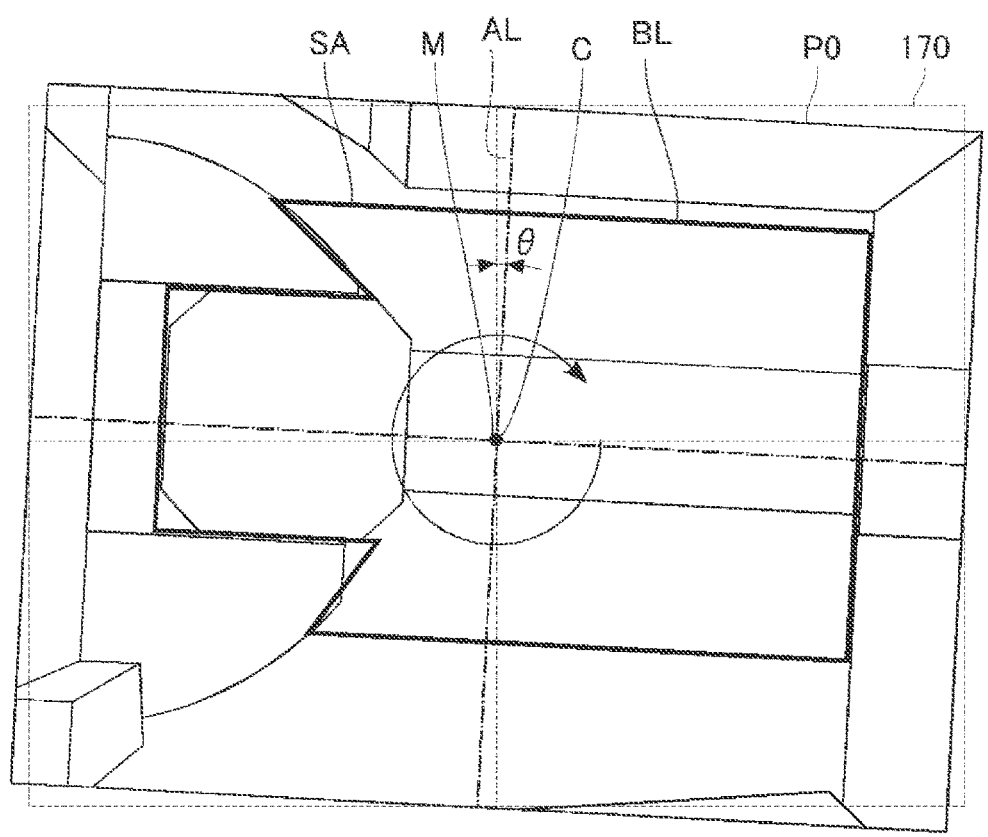

Thus, as illustrated in FIG. 8B, the correction unit 158 turns the taken image P0 about the center C (that is, in the rotating direction of the optical axis L of the camera 30) so that the outline of the specific area SA matches the baseline BL. In this manner, the screen is brought into the matching state and setting error of the target of coolant discharge control is corrected. In this case, however, the taken image P0 is inclined with respect to the reference screen 170, which may result in strangeness of the screen display.

Figure 9A:
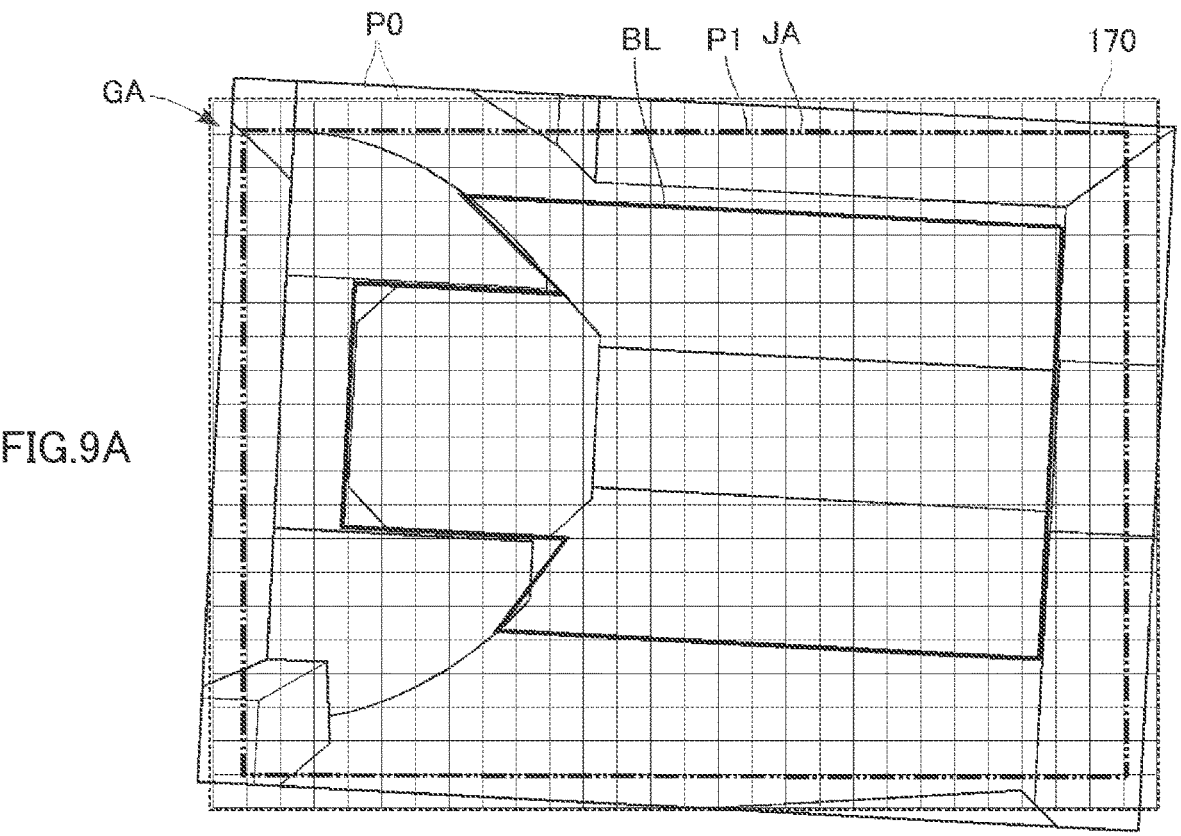
FIGS. 9A and 9B are diagrams illustrating the method for correcting screen display.

As illustrated in FIG. 9A, a grid area GA is initially set on the basis of an ideal state in which no attachment error of the camera 30 is present. In this ideal state, the aspect ratio (screen ratio) of the taken image P0 (see a dotted line) is 4:3 and the number of grid sections is 28×21. Thus, if the taken image P0 is turned about the optical axis, grid sections may be insufficient or excessive at the edge of the taken image P0. If some of the grid sections do not correspond with the image, the degree of accumulation of chips cannot be correctly determined.

Figure 9B:
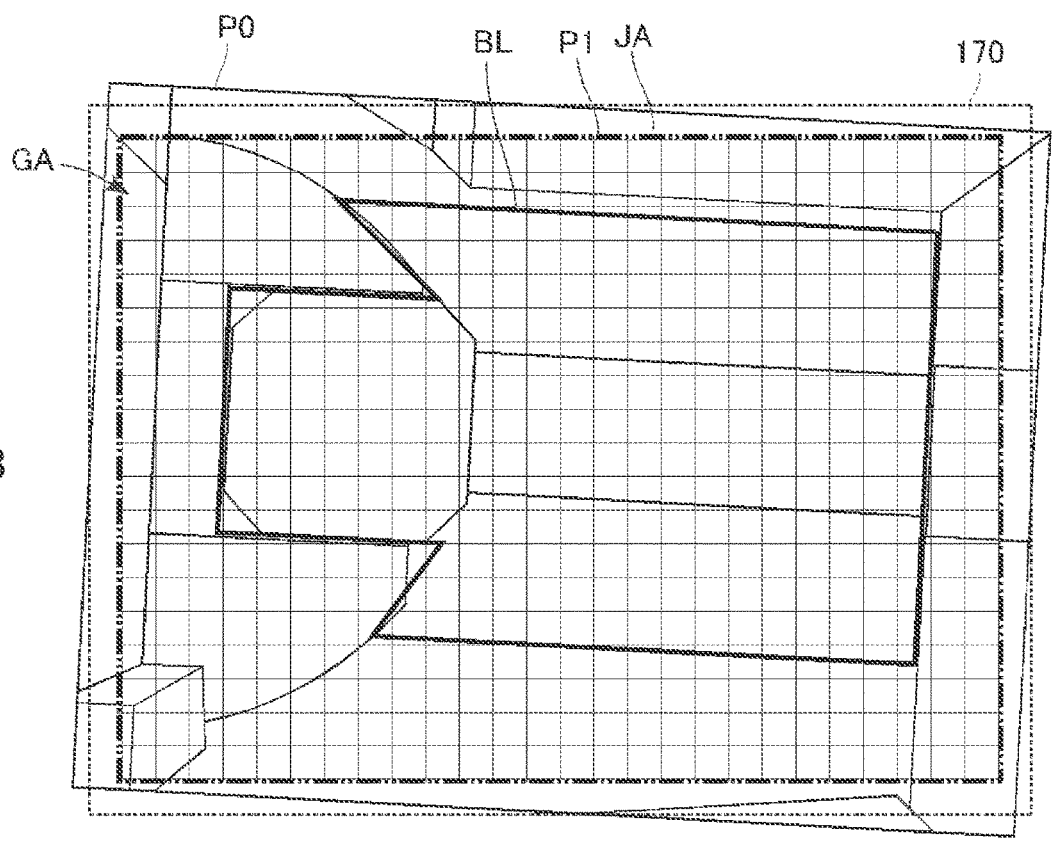

Thus, in the grid area GA, an area (see two-dot chain line) that definitely includes the image is defined as a determination area JA, and only the determination area JA is used for chip determinations. Specifically, as illustrated in FIG. 9B, the display control unit 160 extracts an image of a specific shape by cutting the periphery of the taken image P0 after the angle of view is turned. Hereinafter, the image extracted in this process will be referred to as an "extracted image P1". In the present embodiment, the "specific shape" is assumed to be a rectangle having the same aspect ratio (4:3) as the taken image P0. Note that "cutting" used here may be deleting the periphery of the taken image P0 to leave the image corresponding to the determination area JA as data of the extracted image P1 or extracting the image corresponding to the determination area JA as data of the extracted image P1 instead of deleting the periphery.

In addition, because image processing for chip determinations is performed in units of grid sections, the display control unit 160 cuts the periphery of the taken image P0 at least in units of either of rows and columns of the grid. In the illustrated example, the turning angle θ of the taken image P0 is three degrees, and overlapping portion of a grid image corresponding to one row of the periphery (that is one row at each of upper and lower edges and one column at each of left and right edges) and a grid image corresponding to one row of the periphery of the taken image P0 is cut off. As a result, the number of grid sections is 26×19.

Figure 10A:
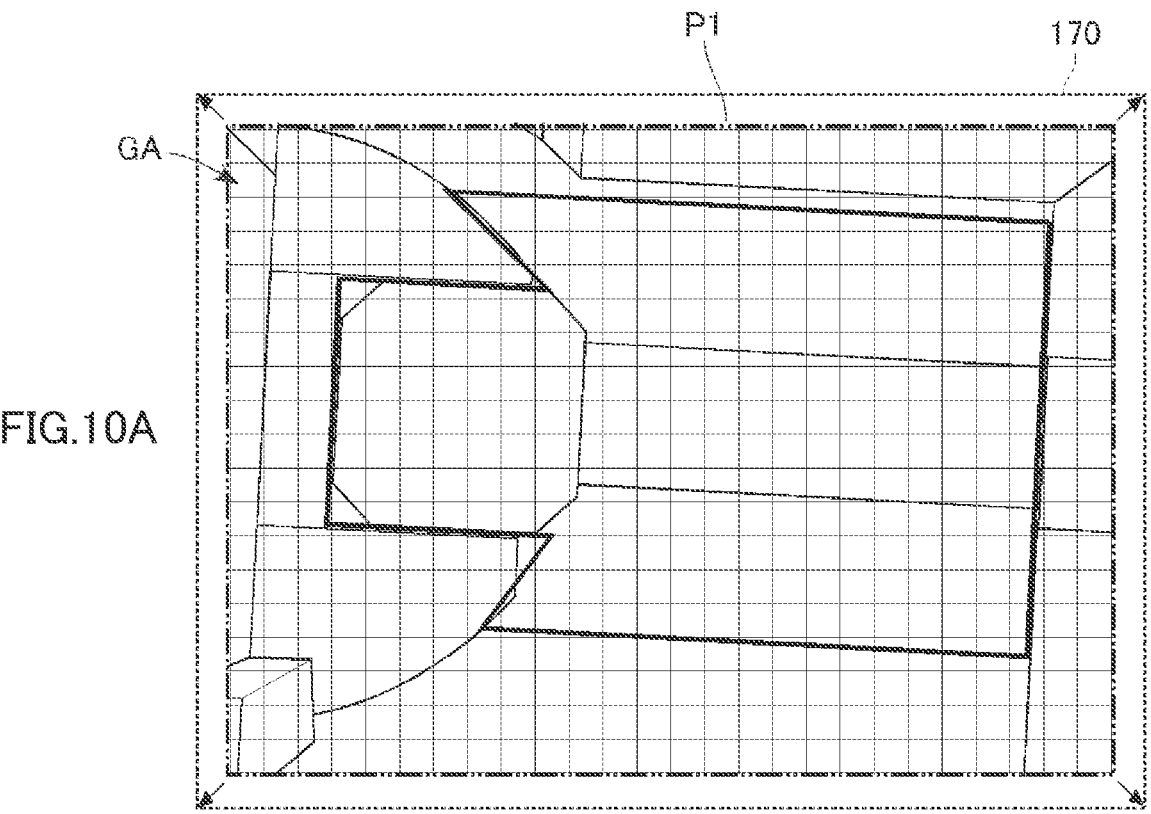
FIGS. 10A and 10B are diagrams illustrating the method for correcting screen display.
Figure 10B:
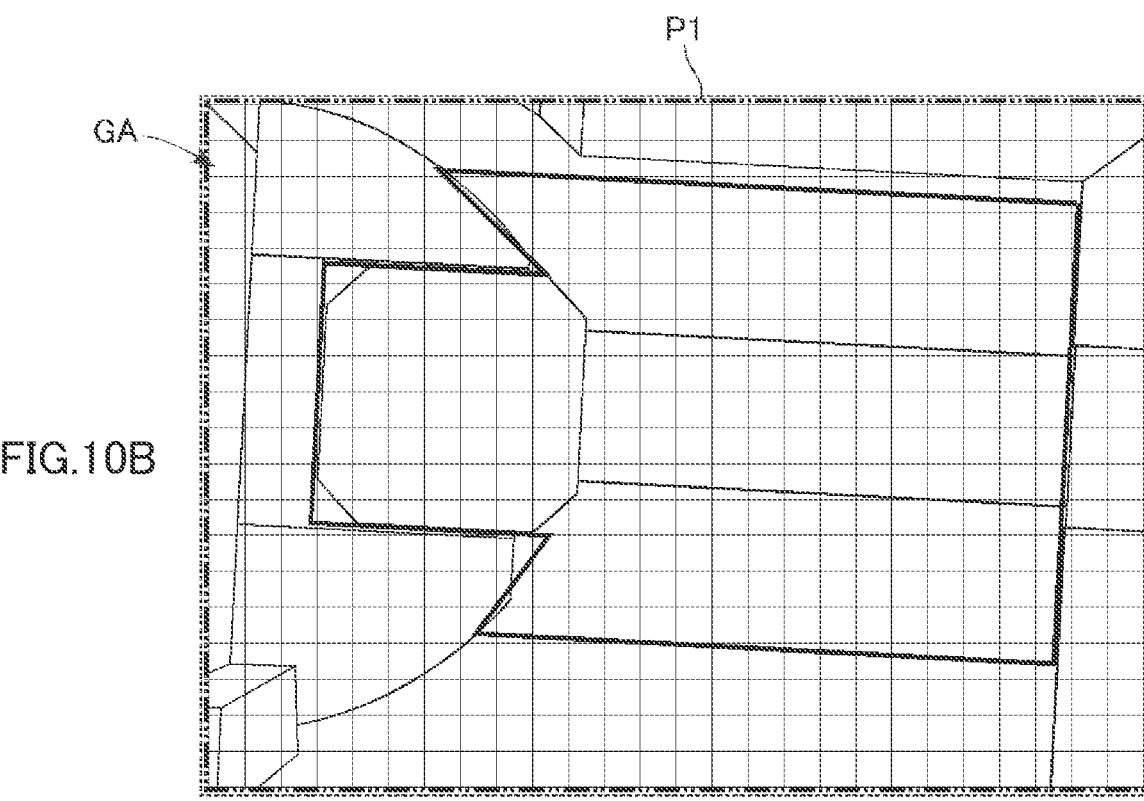

If, however, the extracted image P1 is displayed in this state, the extracted image P1 is smaller than the reference screen 170 and blank spaces are formed around it, which may appear strange. Thus, as illustrated in FIG. 10A, the extracted image P1 is enlarged to a preset size for display on the reference screen 170. Herein, the extracted image P1 is enlarged on the same scale as the original taken image P0. As a result, as illustrated in FIG. 10B, the extracted image P1 has the same size as the reference screen 170, and is displayed in a manner that the sides of the rectangular extracted image P1 are at the same positions as the sides of the rectangular original taken image P0.

Note that recognition and determination of materials (chips) by the recognition unit 156 are performed on an initially set grid area (number of grid sections: 26×19). Because the periphery of the taken image P0 is cut off, the screen display performed by the display control unit 160 may be part of the grid area.

The correction process described above enables the coordinates of the imaging area displayed on the reference screen 170 and the coordinates of the imaging area recognized by software to match each other, and coolant to be discharged accurately toward a target position. Thus, the positions of grid sections set by the grid setting unit 152 and the positions of grid sections that the operator recognizes in the image match each other. The position indicated on the touch panel by the operator corresponds to a grid section, and a region of the image over which the grid section is present is set as a coolant discharge position (target position).

Even when the periphery of the grid area is cut off for display as described above, the positions of the displayed grid section accurately correspond to the actual positions in the imaging area. The coolant discharge control can therefore be kept highly accurate.

Figure 11A:
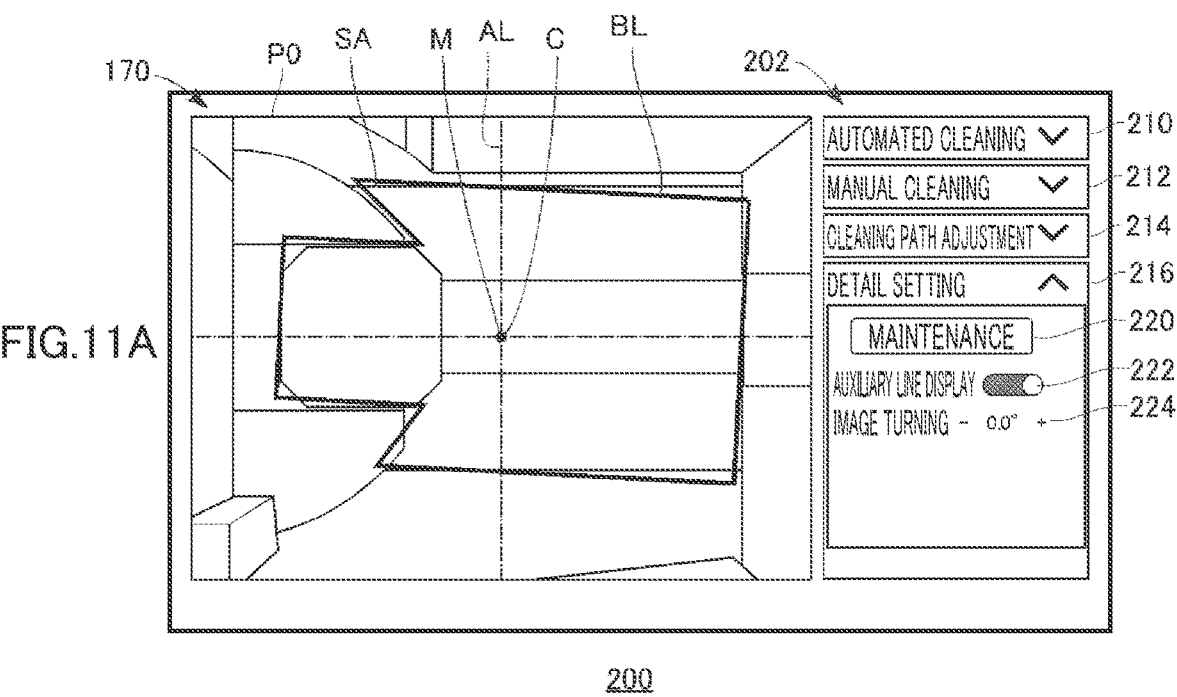
FIGS. 11A and 11B are diagrams illustrating examples of screens on which an operator performs operations.
Figure 11B:
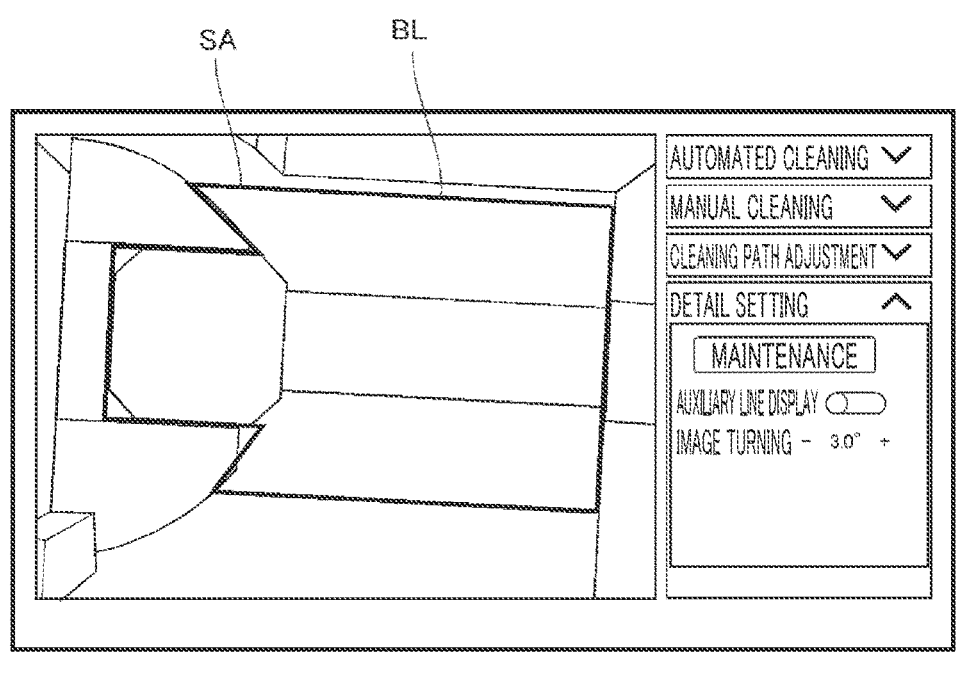

FIGS. 11A and 11B are diagrams illustrating examples of screens on which the operator performs operations.

A screen 200 illustrated in FIG. 11A is displayed on the monitor of the console 4. The screen 200 includes the reference screen 170 described above and an operation screen 202 arranged next to each other. The operation screen 202 includes an automated cleaning button 210, a manual cleaning button 212, a cleaning path adjustment button 214, and detail setting button 216.

The automated cleaning button 210 is selected for entering the automated cleaning mode. The manual cleaning button 212 is selected for entering the manual cleaning mode. The cleaning path adjustment button 214 is selected for adjusting a path for cleaning with the coolant. When each of the buttons is selected, a pull-down menu allowing selection of an operation item in the corresponding cleaning mode is displayed, explanation of details of which is omitted.

When the detail setting button 216 is selected, a maintenance button 220, an auxiliary line display button 222, and an image turning operation portion 224 are displayed as illustrated. When the operator selects the maintenance button 220, the maintenance mode is entered, and the baseline BL is displayed over the taken image P0. When the auxiliary line display button 222 is turned on, the auxiliary lines AL are displayed.

The operator adjusts the yaw angle and the pitch angle of the camera 30 by referring to the reference screen 170 so that the center C of the taken image P0 matches the marker M as described above. The turning angle θ of the taken image P0 can then be adjusted by touching on a + button or a − button of the image turning operation portion 224. The correction unit 158 causes the taken image P0 to turn 0.1 degrees clockwise each time the operator touches the + button, and causes the taken image P0 to turn 0.1 degrees counterclockwise each time the operator touches the − button. As illustrated in FIG. 11B, when the auxiliary line display button 222 is turned off, the auxiliary lines AL are hidden.

Figure 12:
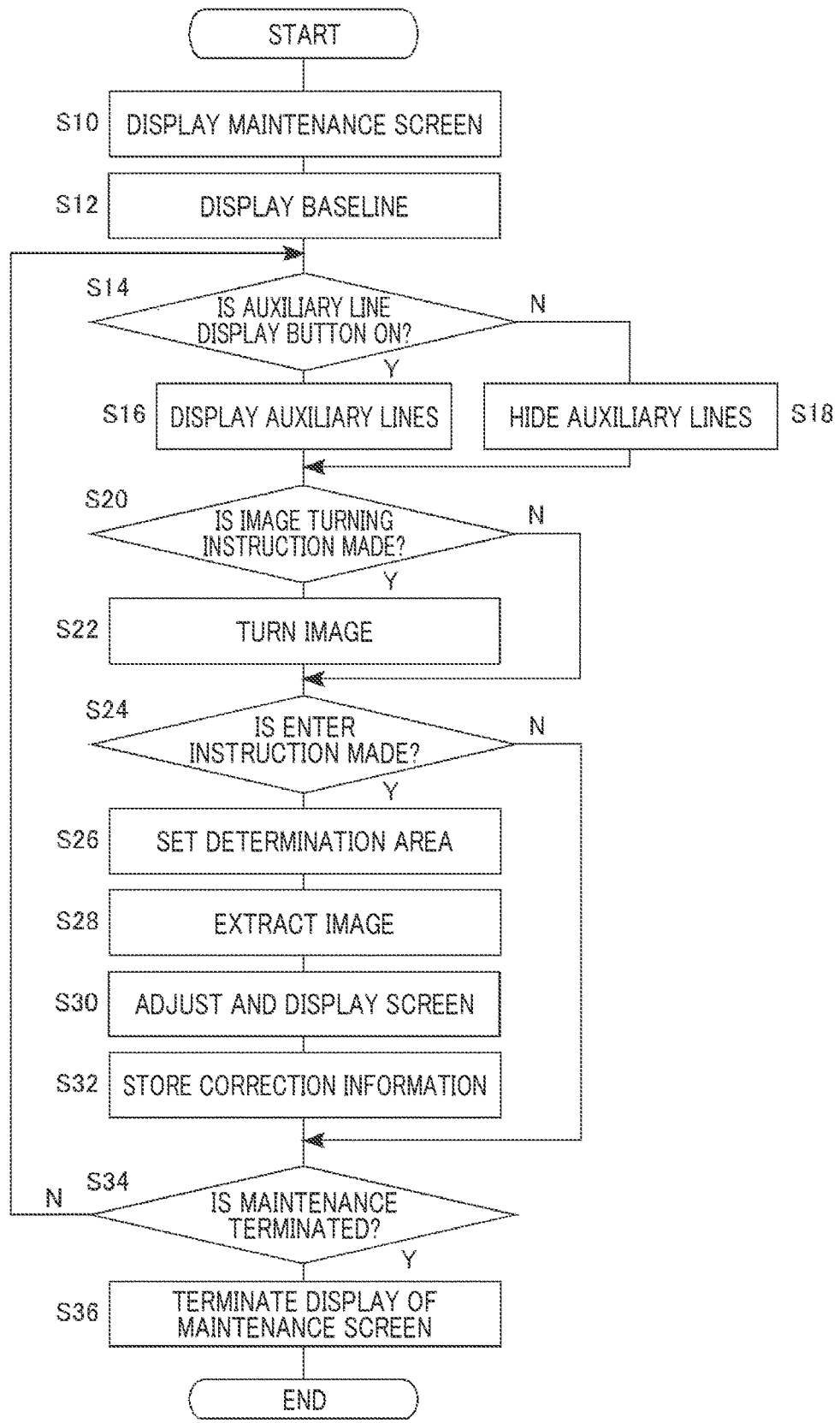
FIG. 12 is a flowchart illustrating a flow of a correction process.

FIG. 12 is a flowchart illustrating a flow of the correction process.

This process is triggered by the operator's selecting the maintenance button 220.

The display control unit 160 causes the taken image P0 to be displayed on the reference screen 170 as a maintenance screen (S10), and causes the baseline BL to be displayed over the taken image P0 (S12).

At this point, if the operator turns on the auxiliary line display button 222 (Y in S14), the display control unit 160 causes the auxiliary lines AL to be displayed (S16). When the auxiliary line display button 222 is off (N in S14), the auxiliary lines AL are hidden (S18). When an image turning instruction is made by operation of the image turning operation portion 224 (Y in S20), the display control unit 160 turns the taken image P0 (S22).

When the outline of the specific area SA matches the baseline BL in this manner and the operator selects an enter button that is not illustrated (Y in S24), the correction unit 158 obtains a determination area JA (S26). Specifically, an area in which the image is definitely included in the grid area GA is set as a determination area JA depending on the inclination of the taken image P0. This determination area JA functions as an "AI inferencing area" on which chip determinations are performed in units of grid sections.

The display control unit 160 extracts the image P1 by cutting off the periphery of the taken image P0 on the basis of the determination area JA (S28), adjusts (enlarges) the extracted image P1, and displays the adjusted extracted image P1 on the reference screen 170 (S30). The correction unit 158 stores the series of correction information as calibration data in the correction information storage unit 146 (S32). The correction information includes a setting angle (turning angle θ) of the taken image P0, settings of the determination area JA, an enlargement ratio (set magnification) of the extracted image P1, and the like. If the enter button is not selected (N in S24), the processing in S26 to S32 is skipped.

If a predetermined maintenance termination condition, such as the operator's selecting another button, is satisfied (Y in S34), the display control unit 160 terminates display of the maintenance screen (S36). If the maintenance termination condition is not satisfied (N in S34), the process returns to S14.

Figure 13:
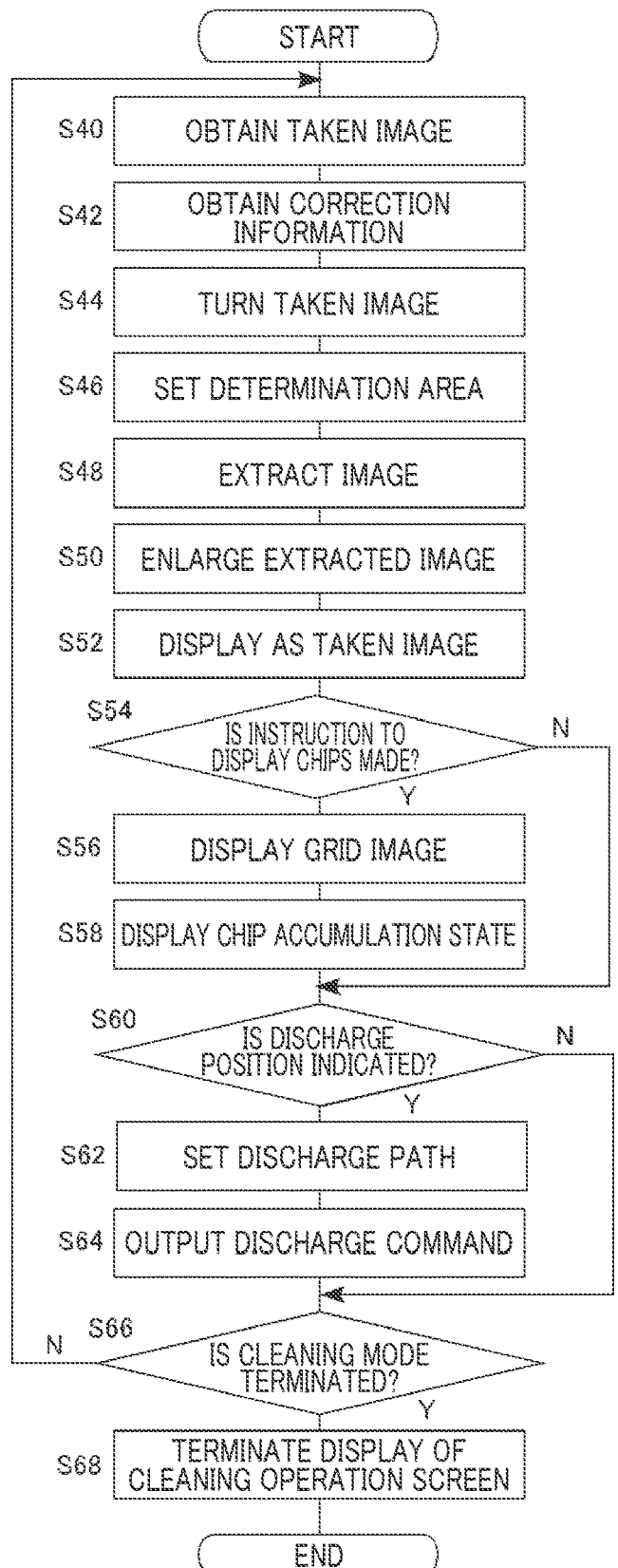
FIG. 13 is a flowchart schematically illustrating a flow of cleaning control.

FIG. 13 is a flowchart schematically illustrating a flow of cleaning control.

When cleaning control is started in either of the automated cleaning mode and the manual cleaning mode, the acquisition unit 150 obtains the taken image P0 (S40). Subsequently, the correction unit 158 reads the correction information (calibration data) stored in the correction information storage unit 146 (S42), and performs the correction process described above on the taken image P0 as internal processing.

Specifically, the correction unit 158 turns the taken image P0 by a set angle (S44), sets a determination area (S46), and extracts an extracted image (S48). Subsequently, the correction unit 158 enlarges the extracted image with the set magnification (S50), and causes the enlarged extracted image to be displayed as the taken image on the screen (S52). Then, if an instruction to display a chip accumulation state is made by an operation input by the operator (Y in S54), the display control unit 160 displays the grid image over the taken image (S56), and further displays the chip accumulation state (S58). The chip accumulation state is displayed in such a manner as in different colors depending on the classes determined by the recognition unit 156.

When the operator indicates a coolant discharge position (target) on the basis of the displayed image (Y in S60), the detection unit 154 detects the indication. The discharge control unit 162 sets a coolant discharge path on the basis of the discharge position (S62), and outputs a discharge command to the machining control device 102 to discharge the coolant in accordance with the discharge path (S64).

Then, if a predetermined cleaning mode termination condition, such as the operator's selecting another button, is satisfied (Y in S66), the display control unit 160 terminates display of the cleaning operation screen (S68). If the cleaning mode termination condition is not satisfied (N in S66), the process returns to S40.

A machine tool has been described with reference to the embodiment.

In the present embodiment, in a case where attachment error is present in installation of a camera 30 in the machining chamber 2, the operator can finely adjust the angle (yaw angle and pitch angle) of the camera 30 by checking the taken image P0. Although the camera 30 cannot be adjusted by turning (roll angle) about its optical axis, the correction can be made by turning the taken image P0. Thus, according to the present embodiment, even though the adjustment of the angle of the camera 30 is limited in the machine tool 1, the imaging area displayed on the screen and the imaging area recognized by software can be made to match each other. Thus, even when the operator makes instructions of cleaning chips with the coolant on the basis of a taken image displayed on the screen, the cleaning instruction position and the coolant discharge position match each other. In other words, the cleaning control can be kept highly accurate.

According to the present embodiment, even though the adjustment of the angle of a camera 30 is limited in the machine tool 1, the correction unit 158 performs correction, that is, turning a taken image in the rotating direction of the optical axis of the camera so that the outline of a specific area in the machine tool displayed on the taken image matches a preset line. The grid setting unit 152 sets a grid on the basis of the corrected taken image, and the display control unit 160 causes the corrected taken image and the grid to be displayed on a display unit in such a manner that the grid is superimposed on the corrected taken image. In this manner, an imaging area displayed (in a grid) on the screen and an imaging area recognized by software can be made to match each other. Because the grid section positions set on the taken image and grid section positions that can be recognized on the image by the operator match each other, fluid can be accurately discharge toward a target in a grid section.

In addition, in the present embodiment, for correction of a taken image P0, an extracted image P1 is extracted by cutting the periphery of the taken image P0, which is inclined as a result of being turned, and the extracted image P1 is enlarged to a preset size for display. Thus, the size of the taken image can be adjusted to the screen while the outline shape of the taken image displayed on the screen is kept rectangular. As a result, the way a taken image is seen does not vary significantly depending on whether the taken image is corrected (that is, depending on individual differences of the installed cameras), and a corrected image does not appear strange to the operator.

Modifications

While the machine tool 1 is a multi-tasking machine in the description of the embodiment, the machine tool 1 may be a turning center or a machining center. Alternatively, the machine tool 1 may be a machine for additive manufacturing in which materials (such as metal powder) are melted by laser and machined. In this case, materials scattered during machining correspond to the "substance" recognized by a material recognition unit.

In the embodiment described above, coolant is presented as an example of fluid discharged for removing chips. In a modification, the fluid may be liquid (cleaning fluid) other than coolant or gas such as air. In this case, a gas discharging portion for discharging gas is provided instead of the liquid discharging portion.

While an example in which the turning angle θ of the taken image P0 in the correction process is three degrees has been presented in the embodiment described above (FIG. 8B), it is needless to say that the turning angle @ varies depending on the installation condition of a camera 30. In a case where the aspect ratio of an extracted image P1 is 4:3, the number of grid sections can be 27×20 when θ=1', the number of grid sections can be 26×20 when θ=2°, the number of grid sections can be 25×19 when θ=4°, and the number of grid sections can be 25×18 when θ=5°, for example.

In the embodiment described above, an example in which the information processing device 100 is an internal computer of the machine tool 1 and is integrated with the console 4 has been presented. The information processing device may alternatively be independent of the console 4. In this case, the information processing device may function as a display unit using the monitor of the console as a remote desktop. Alternatively, the information processing device may be an external computer connected with the machine tool. In this case, the information processing device may be a typical laptop personal computer (PC) or a tablet computer.

Figure 14:
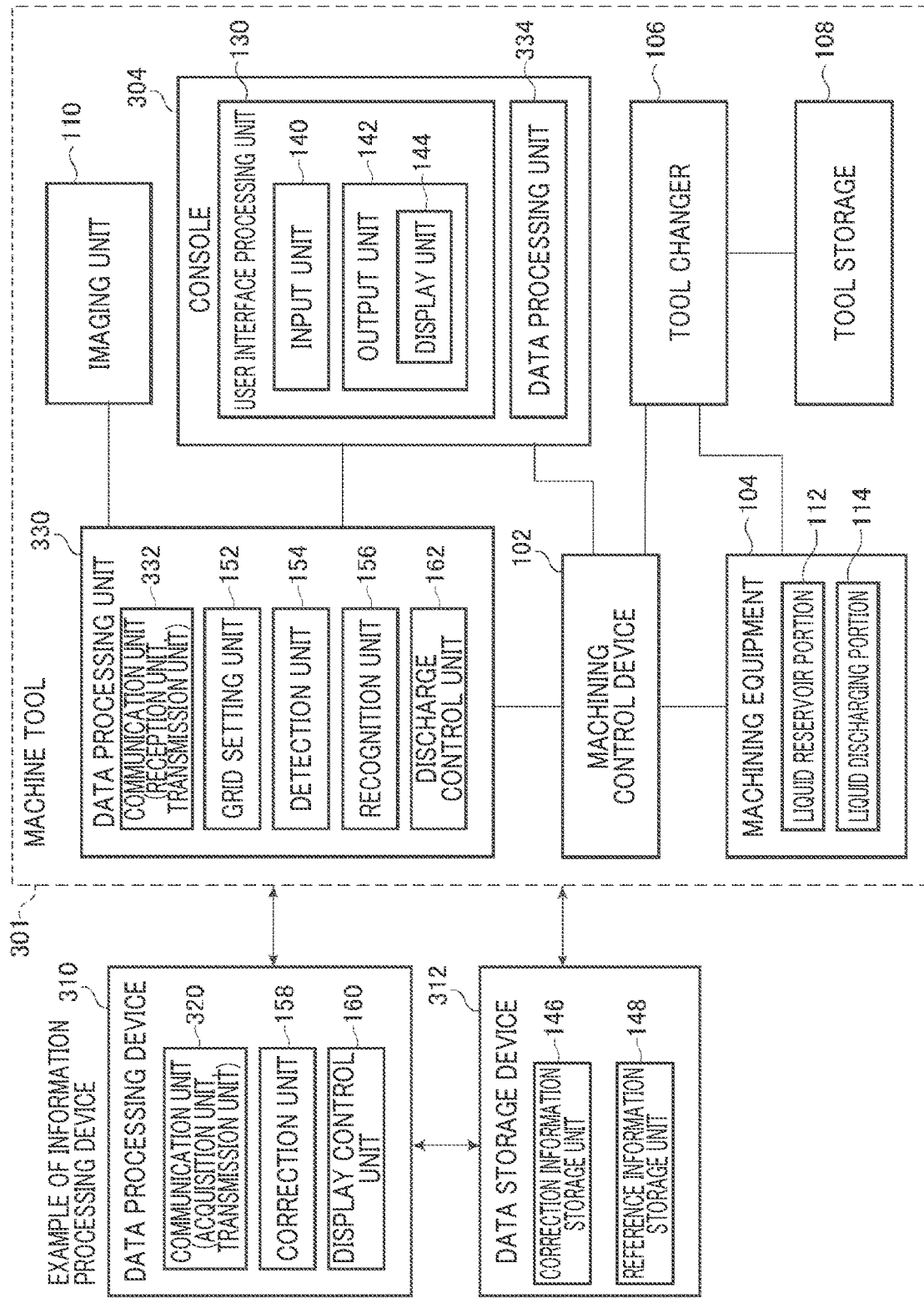
FIG. 14 is a diagram illustrating a configuration of an information processing system according to a modification.

FIG. 14 is a diagram illustrating a configuration of a an information processing system according to modification. Note that components that are similar to those in the embodiment will be designated by the same reference numerals and detailed description thereof is omitted.

In this modification, an information processing device is provided outside a machine tool. Specifically, the information processing system includes a machine tool 301, a data processing device 310, and a data storage device 312. The data processing device 310 functions as the "information processing device".

The machine tool 301 includes a machining control device 102, machining equipment 104, a tool changer 106, a tool storage 108, a data processing unit 330, a console 304, and an imaging unit 110. The data processing unit 330 includes a communication unit 332, a grid setting unit 152, a detection unit 154, a recognition unit 156, and a discharge control unit 162. The communication unit 332 includes a reception unit and a transmission unit, and performs communication with external devices including the data processing device 310 and the data storage device 312.

The console 304 includes a user interface processing unit 130 and a data processing unit 334. The data processing unit 334 outputs control commands to the machining control device 102 on the basis of operations input by the operator.

The data processing unit 334 also controls screens displayed on the display unit 144 in accordance with operations input by the operator.

The data processing device 310 includes a communication unit 320, a correction unit 158, and a display control unit 160. The communication unit 320 includes a reception unit and a transmission unit, and performs communication with the machine tool 301. The data storage device 312 includes a correction information storage unit 146 and a reference information storage unit 148. While the data storage device 312 is connected by wire in this modification, the connection may be a wireless connection. In another embodiment, the data storage device 312 may be integrated as part of the data processing device 310.

As described above, in this modification, the functions of the information processing device 100 of the embodiment are separated to the inside and the outside of the machine tool. Such a configuration also produces effects similar to those of the embodiment described above.

Although not mentioned in the embodiment, the size and the shape of the grid sections may be changeable as necessary. In this case as well, an extracted image may be obtained by cutting the periphery of a taken image in units of grid sections.

In the embodiment described above, an example in which the operator manually adjusts the angles of the camera 30 about the yaw axis and the pitch axis to eliminate attachment error of the camera 30 has been presented. In a modification, for controlling the angles of a camera, the information processing device may include a drive control unit to control a first turning about the yaw axis and a second turning about the pitch axis. The drive control unit controls the first turning and the second turning so that the optical axis of the camera is aligned with a preset center setting position (marker M) in the imaging area before the correction performed by the correction unit.

In the embodiment described above, an example of a configuration in which a camera 30 cannot turn about its optical axis has been presented as a restricted state of the camera 30. In a modification, a camera 30 may be turnable about its optical axis but the turning angle may be limited. Alternatively, a camera 30 itself may have a turnable structure but the turning may be limited to avoid interference with surrounding structures.

In the embodiment described above, as illustrated in FIGS. 7 and 8, an example in which the center C of the taken image P0 and the optical axis L of the camera 30 match each other and the taken image P0 is turned about the optical axis L has been presented. In a modification, a taken image may be turned regardless of the optical axis. In this case as well, the correction unit turns the taken image so that an outline of a specific area matches a baseline. Specifically, it is preferable to turn a taken image about a perpendicular axis perpendicular to the plane of the taken image and passing the center of the taken image.

Figure 15:
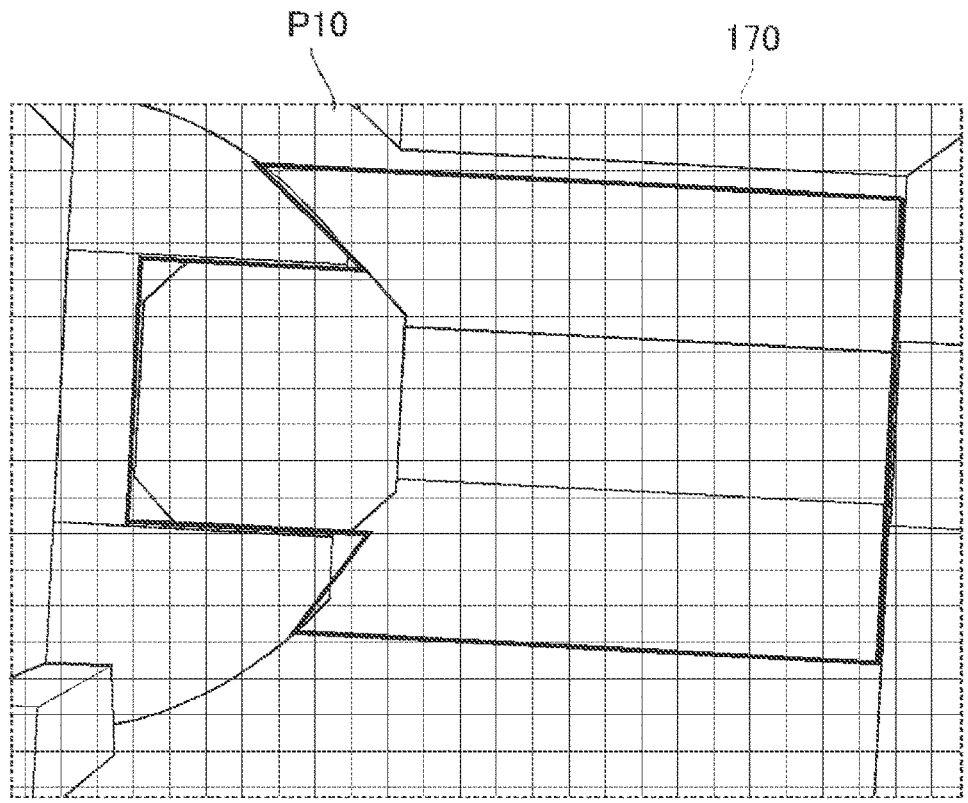
FIG. 15 is a diagram illustrating an image processing method according to a modification.
Figure 15:
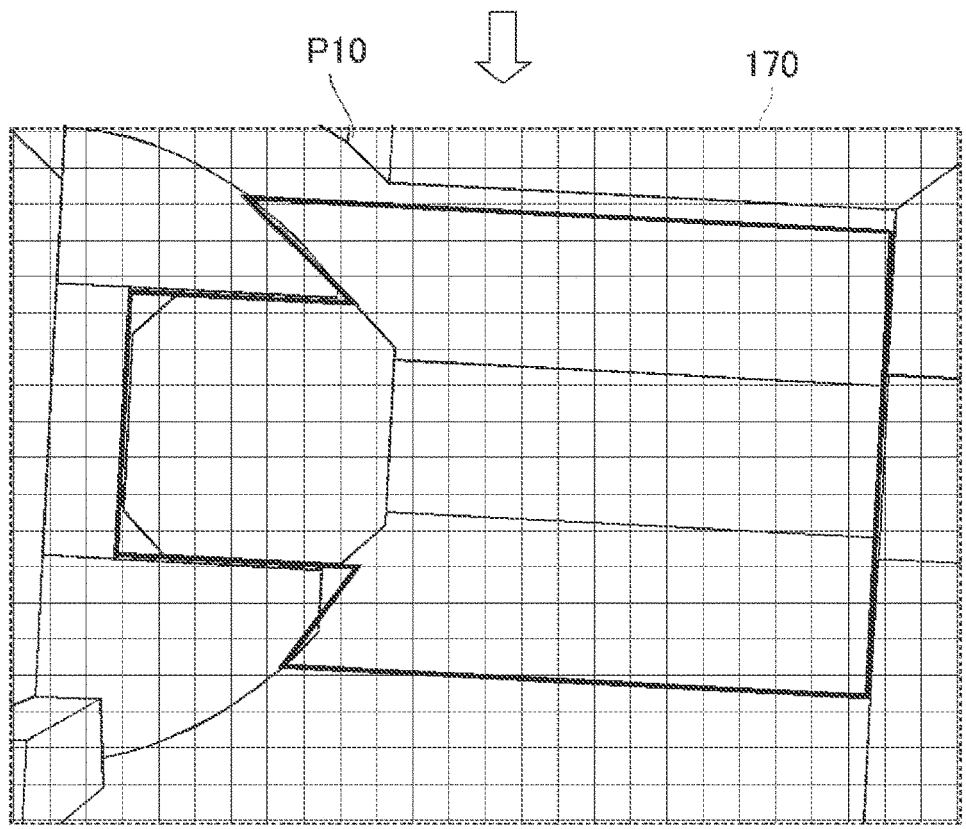

FIG. 15 is a diagram illustrating an image processing method according to a modification.

In this modification, a taken image shown in upper part of FIG. 15 can be corrected to that shown in lower part of FIG. 15. Specifically, the grid setting unit 152 performs a process (grid line division process) of overlaying grid lines on corresponding preset positions on a taken image received from the imaging unit 110. As a result of such a process, the relation between the overlaid grid lines and the taken image P10 may become as shown in the upper part of FIG. 15. According to the data of the overlaid grid lines and the taken image P10, among the grid sections that overlap with the taken image P10, some of outermost grid sections do not have all their four sides fully appearing on the screen. In such a case, the display control unit 160 can perform a process of ignoring the grid sections that do not have all their four sides fully overlapping with the taken image and displaying only grid sections with all of their four sides fully overlapping with the taken image P10 in a size adjusted to the reference screen. Alternatively, the grid setting unit 152 may perform such a process of detecting the presence of grid sections that do not have all their four sides overlapping with the taken image P10 (or grid sections that do not have all their four sides fully appearing on the screen) and performing adjustment by moving the whole mesh-like grid lines vertically and horizontally so that all the four sides overlap with the taken image P10 (lower part of FIG. 15).

The present invention is not limited to the embodiment and modifications thereof described above, and any component thereof may be modified and embodied without departing from the scope of the invention. Components described in the embodiments and modifications may be combined as appropriate to form various embodiments. Some components presented in the may be omitted from the components embodiments and modifications.

CROSS REFERENCE TO RELATED APPLICATIONS

This application is a continuation application of International Application No. PCT/JP2022/031001, filed on Aug. 17, 2022, which claims priority to and the benefit of Japanese Patent Application No. 2021-144424 filed on Sep. 6, 2021. The contents of these applications are incorporated herein by reference in their entirety.

What is claimed is:

1. An information processing device that processes an image to be used for a machine tool, the machine tool taking the image of an imaging area with a camera fixed to the machine tool, and discharging fluid toward a target on the basis of the image, the information processing device comprising:
   a processor including a correction unit, a grid setting unit, a display control unit, and a recognition unit; and
   a memory including a reference information storage unit,
   wherein the reference information storage unit stores, in advance, a line that is to correspond to an outline of a specific area of the machine tool on the image when the image is displayed;
   the correction unit turns the image in a rotating direction of an optical axis of the camera so that the outline of the specific area displayed on the image matches the line;
   the grid setting unit divides the image of the imaging area into a plurality of grid sections;
   the display control unit causes a corrected image, resulting from correction by the correction unit, to be displayed on a display, and superimposes the grid sections on the corrected image, and
   the recognition unit analyzes the presence of the target in each grid section.

2. The information processing device according to claim 1, wherein
   turning of the camera about the optical axis is restricted, and
   the correction unit corrects an error in setting the target by turning the image.

3. The information processing device according to claim 1, wherein the processor further includes
   an input unit that receives operations input by an operator, wherein
   the display control unit displays the line over the image before the correction by the correction unit, and
   the correction unit turns the image in accordance with an operation input by the operator.

4. The information processing device according to claim 3, wherein
   the display control unit displays an auxiliary line passing the optical axis over the image in accordance with an operation input by the operator.

5. The information processing device according to claim 1, wherein the processor further includes
   a drive control unit for controlling angles of the camera, the drive control unit controlling a first turning about a yaw axis perpendicular to the optical axis and a second turning about a pitch axis perpendicular to the optical axis and the yaw axis, wherein
   the drive control unit controls the first turning and the second turning so that the optical axis of the camera is positioned at a preset center setting position in the imaging area before the correction by the correction unit.

6. The information processing device according to claim 1, wherein
   the display control unit causes a rectangular image to be displayed on the display, the rectangular image being obtained by cutting a periphery of the image resulting from turning an angle of view.

7. The information processing device according to claim 1, wherein
   the recognition unit that recognizes a predetermined substance in the imaging area in units of the grid sections on the basis of the image; and
   a discharge control unit that controls a discharging portion for discharging the fluid, wherein
   the discharge control unit sets the target on the basis of the substance recognized in the imaging area.

8. An information processing device that processes an image to be used for a machine tool, the machine tool taking the image of an imaging area with a camera fixed to the machine tool, and discharging fluid toward a target on the basis of information of the image, the information processing device comprising:
   a processor including a correction unit, a grid setting unit, a display control unit, and a recognition unit,
   wherein the display control unit controls display of a line at a specific position on a display, the line being to correspond to an outline of a specific area of the machine tool;
   the correction unit turns the image in a state in which the image and the line are displayed on the display with the line overlaid on the image, so that the outline of the specific area of the machine tool imaged in the image matches the line; and
   the grid setting unit divides the image of the imaging area into a plurality of grid sections;
   wherein the display control unit causes a corrected image, resulting from correction by the correction unit, to be displayed on the display, and superimposes the grid sections on the corrected image, and
   the recognition unit analyzes the presence of the target in each grid section.

9. A machine tool comprising:
   a camera that images an imaging area set in a machining chamber;

an information processing device that processes an image obtained by the imaging; and a discharging portion that discharges fluid toward a target on the basis of the processed image, wherein the information processing device includes:

a processor including a correction unit, a grid setting unit, a display control unit, and a recognition unit; and a memory including a reference information storage unit, wherein the reference information storage unit stores, in advance, a line that is to correspond to an outline of a specific area set in the machining chamber on the image when the image is displayed;

the correction unit turns the image in a rotating direction of an optical axis of the camera so that the outline of the specific area displayed on the image matches the line;

the grid setting unit that divides an image of the imaging area into a plurality of grid sections;

the display control unit causes a corrected image, resulting from correction by the correction unit, to be displayed on a display, and superimposes the grid sections on the corrected image, and the recognition unit analyzes the presence of the target in each grid section.

* * * * *